United States Patent [19]

Smith et al.

[11] 4,283,152
[45] Aug. 11, 1981

[54] HAND AND GUARD RAILS

[75] Inventors: Sydney J. Smith; Peter F. Chambers, both of Nr. Preston, England

[73] Assignee: British Leyland UK Limited, London, England

[21] Appl. No.: 777,144

[22] Filed: Mar. 14, 1977

[51] Int. Cl.³ .............................................. F16B 7/08
[52] U.S. Cl. ...................................... 403/3; 403/233; 403/174; 256/65
[58] Field of Search ............... 403/233, 234, 235, 236, 403/237, 403, 174, 178, 170, 218, 191, 3; 256/65

[56] References Cited

U.S. PATENT DOCUMENTS

| 998,904 | 7/1911 | Jacobs | 403/174 X |
|---|---|---|---|
| 1,261,213 | 4/1918 | Clay | 403/233 |
| 1,668,754 | 5/1928 | Barney | 403/312 |
| 3,554,589 | 1/1971 | Boggs | 403/313 |
| 4,007,993 | 2/1977 | Schwartz | 403/233 X |

FOREIGN PATENT DOCUMENTS

| 2015107 | 10/1971 | Fed. Rep. of Germany | 403/233 |
|---|---|---|---|
| 1118050 | 3/1956 | France | . |
| 66656 | 3/1957 | France | 403/218 |
| 1089984 | 3/1957 | France | . |
| 1332686 | 6/1963 | France | . |
| 446513 | 3/1949 | Italy | 403/218 |
| 330740 | 8/1958 | Switzerland | . |

Primary Examiner—Andrew V. Kundrat
Attorney, Agent, or Firm—Brisebois & Kruger

[57] ABSTRACT

A hand and guard rail system has a clamp member made up of two identical elements which have semi-circular sectional portions at right angles to one another. The elements co-operate in clamping so that each portion forms a tubular portion to locate a pair of tubular rail members at right angles to each other.

2 Claims, 7 Drawing Figures

HAND AND GUARD RAILS

BACKGROUND OF THE INVENTION

The present invention relates to hand and guard rails particularly for fitting inside public service vehicles such as buses.

Known hand and guard rail systems in p.s.v.'s employ metal tubes which are connected together or supported by fittings which require individual machining in order to tailor them to the particular situation. The joints employed also require hard drilling and rivetting.

The present invention is concerned with providing a hand and guard rail system which is simpler to assemble, uses fewer different kinds of fittings or elements, is more flexible from the point of view of satisfying different operator requirements, and also allows electric cable access through the joints.

SUMMARY OF THE INVENTION

According to the present invention an assembly for use in constructing a hand and/or guard rail comprises:

a clamp member which consists of two identical elements, each element having two semi-circular sectioned portions at right angles to one another and the two elements being detachably connected to each other by securing means so that each of the two corresponding semi-circular portions co-operate to form two tubular portions at right angles to each other; and a tubular rail member having an external diameter substantially the same as the internal diameter of the said tubular portions of the clamp member and adapted to fit in the said tubular portion to be clamped therein by the said securing means.

An assembly as specified may be provided in which the tubular rail member has a flared end which is adapted to fit into an enlarged diameter portion of the said tubular portion in order to prevent longitudinal movement of the rail member with respect to the clamp member after the two halves of the latter have been secured together to claim the rail member, the said enlarged diameter portion being formed by a semi-circular groove formed in each of the said semi-circular sectioned portions.

An assembly as specified may be provided in which the said securing means comprises at least one screw which is adapted to engage in a threaded hole in at least one of the two said elements of the clamp member.

An assembly as specified may include a second tubular member which is clamped at an intermediate point along its length by the clamp member so that with said first tubular rail member it forms a T-shaped assembly.

An assembly as specified may include a two-piece clamp which is adapted to grip a split ring carried by an end of the tubular member, the two halves of the two-piece clamp having mounting portions by which the clamp is adapted to be secured to a support.

An assembly as specified may include a T-shaped member which comprises a tubular portion having a flared end and adapted to fit within the clamp member specified above and a plate portion forming the crossbar of the T; the plate portion being adapted to be secured to a support member.

An assembly as specified may include a two-piece generally cylindrical adaptor which is split axially to form two portions which are of substantially semi-circular cross-section, each portion having at least two internal webs of different diameter so that when the adaptor is fitted within the clamp member it can grip the ends of two tubes of different diameters within the clamp member.

An assembly as specified may include a two-piece insert adapted to fit within the clamp member, the insert comprising two portions of semi-circular cross-section, each portion having a channel-sectioned groove formed in it so that the two grooves in the two portions together define a bore in which can be located a pin which itself is adapted to engage in a loop to form a mounting for a strap or similar handle.

An exemplary embodiment of the invention will now be described with reference to the accompanying drawings of a hand and guard rail system for use within a passenger service vehicle (in this case a bus).

In particular the system includes a clamp member 1 generally indicated in FIGS. 1, 2, 4 and 5 which can be used in a number of situations. The clamp member 1 consists of two identical elements 1a) and 1b) which are detachably connected to each other by screws 2.

Figure 1:
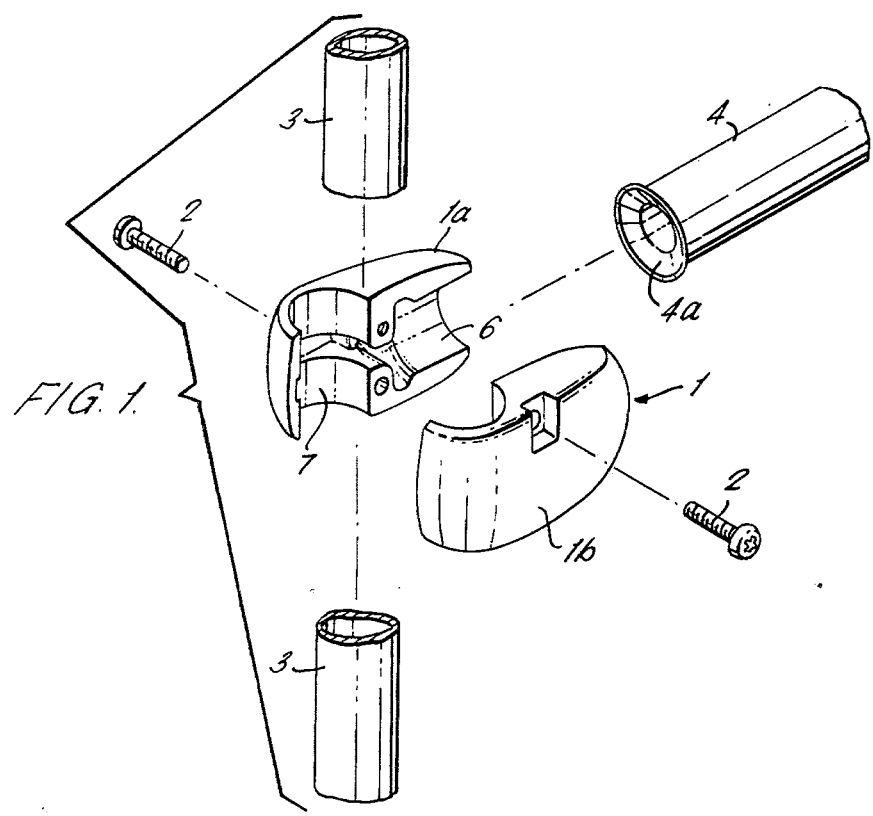
FIGS. 1 to 6 are isometric views.

FIG. 1 shows an arrangement where a T-junction needs to be formed between an upright post 3 and a horizontal hand rail 4. The hand rail 4 has a flared end 4a which fits within a complimentary blind bore 6 in clamp member 1. By using a flared end 4a in combination with bore 6 it is possible to clamp the rail 4 on tightening screws 2. However before tightening the screws the rail 4 can be rotated without loss of axial location. The post 3 passes through bore 7 formed by parts 1a, b of the clamp member 1.

Figure 2:
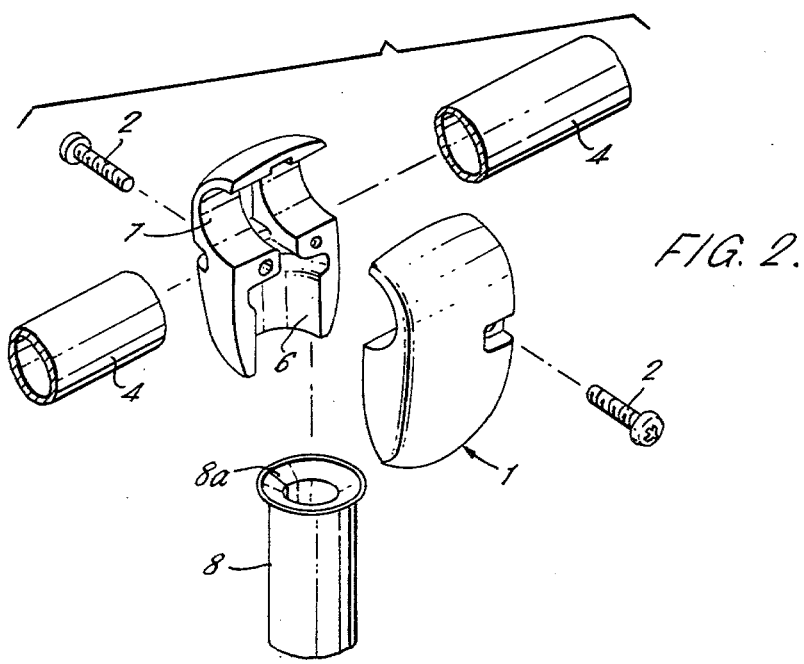

FIG. 2 shows an upright tube 8 having a flared end 8a. A horizontal rail 4 passes through clamp member 1 similar to that described in connection with FIG. 1. Flared end 8a is retained in bore 6 of the clamp member.

Figure 3:
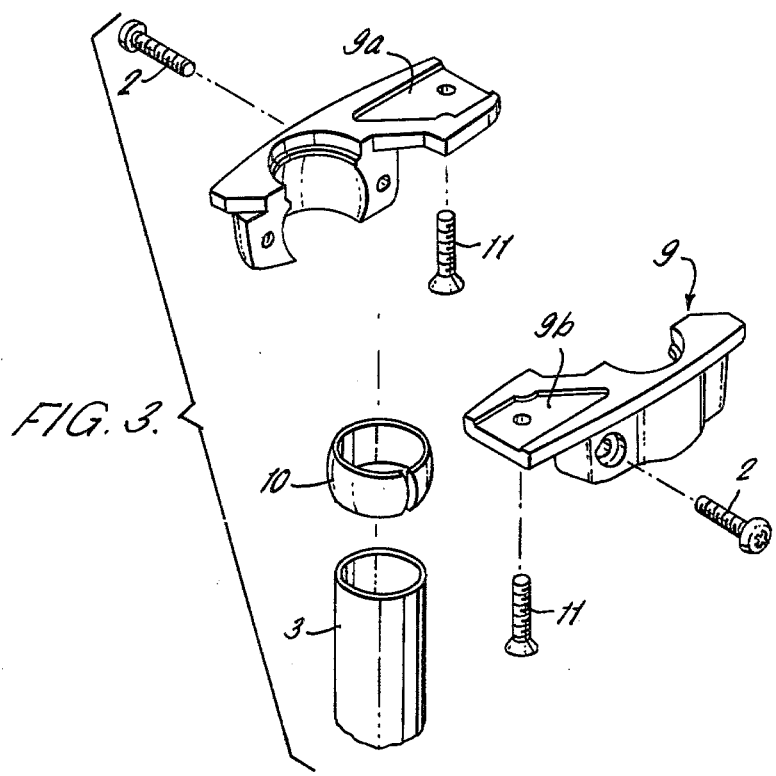

FIG. 3 shows the upper end of a vertical tube 3 secured to the ceiling of the bus. A two-piece clamp member 9 is provided which co-operate with a split ring or bush 10 adapted to fit around the top end of tube 3. Two parts 9a, 9b of the clamp member 9 are held together by screws 2 in order to clamp the split ring 10 tightly around the tube 3. The outer surface of the split ring 10 is spherical so allowing up to, typically, 10° angular misalignment from the vertical. The clamp member 9 is secured to the ceiling by screws 11.

Figure 4:
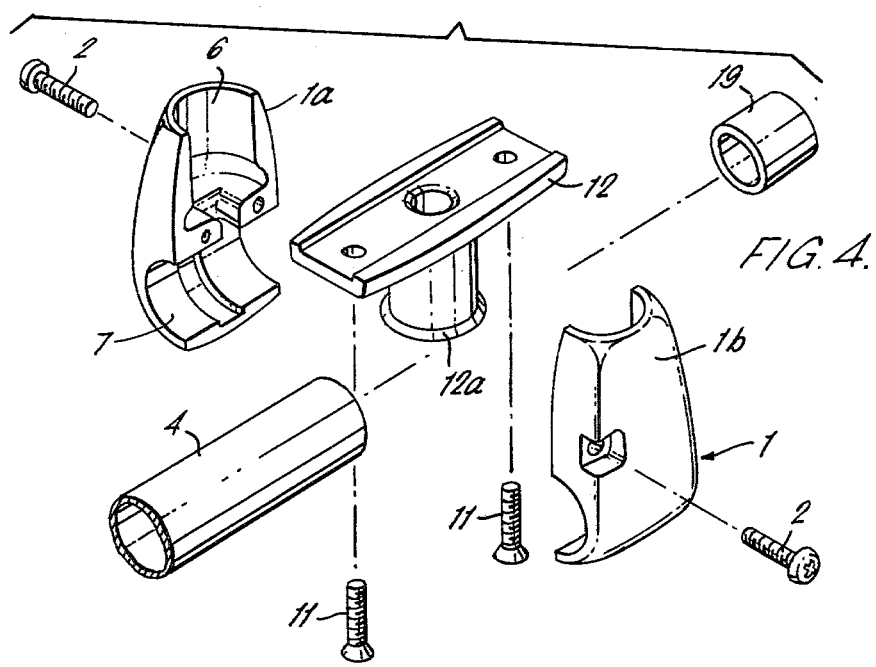

FIG. 4 shows an arrangement supporting guard rail 4 parallel to the bus ceiling. A combination of clamp member 1 and a T-shaped support member 12 is used. The member 12 has a flared end 12a wherewith it is located in bore 6 of clamp member 1. Plastic end plug 19 blanks off the joint by fitting into the unused part of bore 7 in clamp 1.

Figure 5:
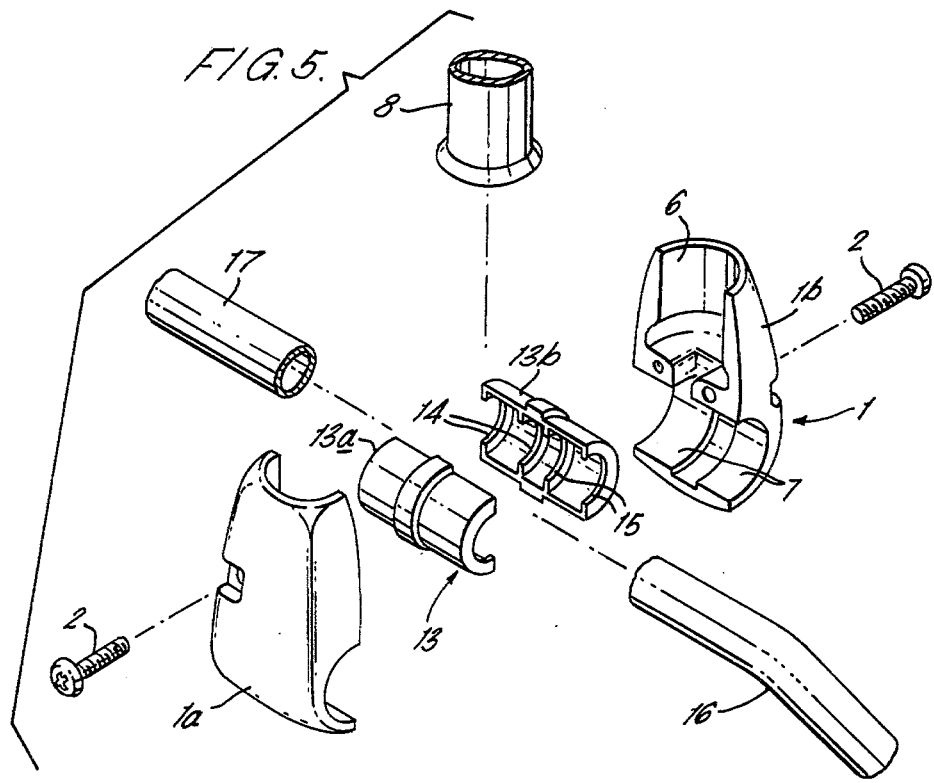

FIG. 5 shows an arrangement to join two rails 16, 17 of differing cross-sections end to end. An adaptor 13 is used in conjunction with a clamp 1. The adaptor 13 is in two parts 13a, b. Each part has ribs 14, 15 of appropriate form to grip on their respective tube ends. Typically an oral section tube 16 is here intended for connection to a round section tube 17.

Figure 6:
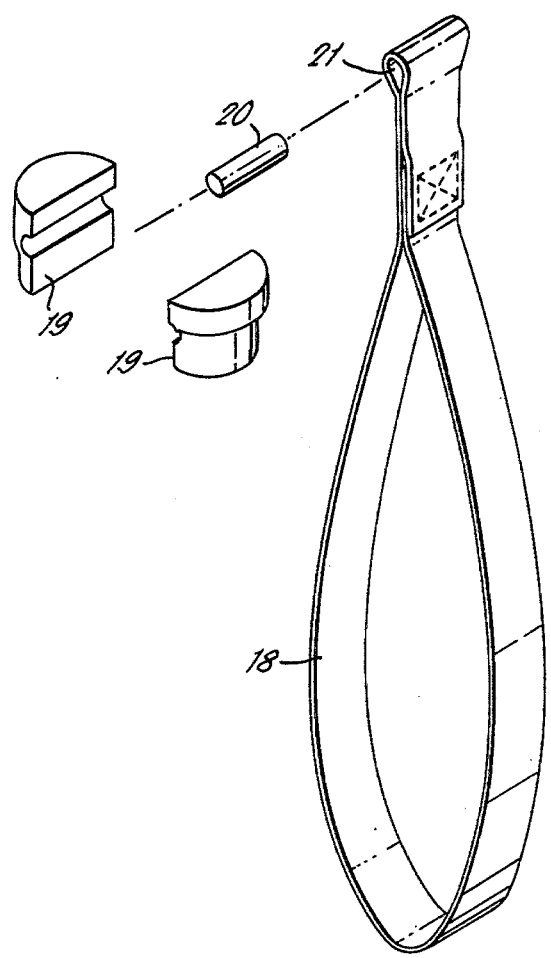

FIG. 6 provides an arrangement to mount a grab handle or hanger strap 18. A two piece insert 19 of plastic is provided which is designed to clamp a pin 20 carried in a loop 21 formed at the upper end of a grab handle 18. The insert 19 is housed in a bore similar to bore 6 of a clamp member 1 shown in FIGS. 1, 2, 4 and 5.

Figure 7:
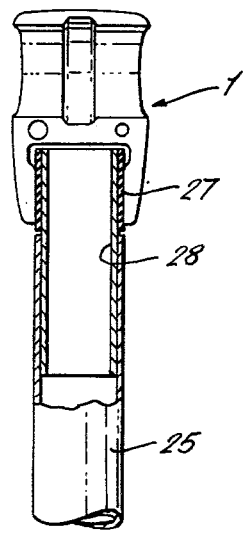
FIG. 7 is a sectional view of various arrangements with applicants clamp member.

An alternative form of fitting between clamp member 1 and a tube is shown in FIG. 7. The clamp member 1 is connected to stanchion 25 by way of a composite tubular rail member made up of: a rubber bush 27 secured to a steel liner tube 28. This arrangement allows a degree of compliance between stanchion 25 and clamp member 1.

In the illustrated system the tubes used are of metal with a plastics outer coating.

We claim:

1. An assembly for use in constructing a hand and/or guard rail characterized by:
   (a) a clamp member (1) comprising two identical elements, each element having two semi-circular sectioned portions (6,7) at right angles to one another and the two elements being detachably connected to each other by securing means (2) so that each of the two corresponding semi-circular portions cooperate to form two tubular portions at right angles to each other; and
   (b) a tubular rail member (4) having an external diameter substantially the same as the internal diameter of the tubular portions (6) of the clamp member (1) and adapted to fit in the tubular portion (6) to be clamped therein by the securing means, and further comprising a two-piece generally cylindrical adaptor (13) which is split axially to form two portions (13a, 13b) which are of substantially semi-circular cross-section, each portion having at least two internal webs (14, 15) of different diameter so that when the adaptor is fitted within the clamp member (1) it can grip the ends of two tubes of different diameters within the clamp member.

2. An assembly for use in constructing a hand and/or guard rail characterized by:
   (a) a clamp member (1) comprising two identical elements, each element having two semi-circular sectioned portions (6,7) at right angles to one another and the two elements being detachably connected to each other by securing means (2) so that each of the two corresponding semi-circular portions cooperate to form two tubular portions at right angles to each other; and
   (b) a tubular rail member (4) having an external diameter substantially the same as the internal diameter of the tubular portions (6) of the clamp member (1) and adapted to fit in the tubular portion (6) to be clamped therein by the securing means, and wherein
   said tubular rail member comprises a composite structure made up of an outer resilient bush (27) with the external diameter substantially the same as the internal diameter of the tubular portion (6) of the clamp member (1) and an inner rigid tube (28).

* * * * *